United States Patent
Saito

(10) Patent No.: US 10,620,907 B2
(45) Date of Patent: Apr. 14, 2020

(54) PARAMETER SETTING DEVICE AND METHOD IN SIGNAL PROCESSING APPARATUS

(71) Applicant: YAMAHA CORPORATION, Hamamatsu-shi (JP)

(72) Inventor: Kosuke Saito, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/282,711

(22) Filed: Feb. 22, 2019

(65) Prior Publication Data

US 2019/0187951 A1  Jun. 20, 2019

Related U.S. Application Data

(63) Continuation of application No. PCT/JP2017/031458, filed on Aug. 31, 2017.

(30) Foreign Application Priority Data

Sep. 2, 2016  (JP) .................................. 2016-172232

(51) Int. Cl.
  *G06F 3/16* (2006.01)
  *H04H 60/04* (2008.01)
  (Continued)

(52) U.S. Cl.
  CPC ............. *G06F 3/165* (2013.01); *H04H 60/04* (2013.01); *H04R 3/00* (2013.01); *H04S 3/008* (2013.01)

(58) Field of Classification Search
  CPC .......... G06F 3/165; H04R 3/00; H04H 60/04; G11B 27/034; H04S 3/008
  See application file for complete search history.

(56) References Cited

U.S. PATENT DOCUMENTS 10,069,582 B2   9/2018   Nishikori et al.
2006/0220929 A1*  10/2006   Aiso .................... G06F 3/0362
                                                   341/50

(Continued)

FOREIGN PATENT DOCUMENTS

JP    2011199611 A    10/2011
JP    2015171001 A    9/2015
JP    2016096469 A    5/2016

OTHER PUBLICATIONS

English translation of Written Opinion issued in Intl. Appln. No. PCT/JP2017/031458 dated Nov. 28, 2017.

(Continued)

*Primary Examiner* — Andrew L Sniezek
(74) *Attorney, Agent, or Firm* — Rossi, Kimms & McDowell LLP

(57) ABSTRACT

A setting device includes: a manual-operator operable by a user for adjusting a parameter value; a mode selector for selecting a temporary operation mode that is a mode for temporarily operating the manual-operator; a memory; and a controller. The controller performs storage control for, in association with an adjusting operation executed via the manual-operator while the temporary operation mode is selected, storing into the memory a pre-change parameter value as a change history and return control for returning the adjusted parameter value of the manual-operator to the pre-change parameter value based on the change history in response to ending of the temporary operation mode. Because only the parameter value adjusted during the temporary operation mode can be returned to the pre-change parameter value, the inventive setting device can easily, quickly, and accurately return the parameter value, temporarily changed during the temporary operation mode, to the pre-change parameter value.

25 Claims, 3 Drawing Sheets

(51) Int. Cl.
*H04R 3/00* (2006.01)
*H04S 3/00* (2006.01)

(56) References Cited

U.S. PATENT DOCUMENTS

2015/0254055 A1   9/2015  Okabayashi et al.
2016/0283186 A1*  9/2016  Terada ................... G06F 3/165

OTHER PUBLICATIONS

International Preliminary Report on Patentability issued in Intl. Appln. No. PCT/JP2017/031458 dated Mar. 5, 2019. English translation provided.
International Search Report issued in Intl. Appln No. PCT/JP2017/031458 dated Nov. 28, 2017. English translation provided.
Written Opinion issued in Intl. Appln. No. PCT/JP2017/031458 dated Nov. 28, 2017.
"Digital Mixing Console LS9 LS9-16/LS9-32 Owner's Manual." 2006-2012: 290. Yamaha Corporation. Japan. English translation provided.

* cited by examiner

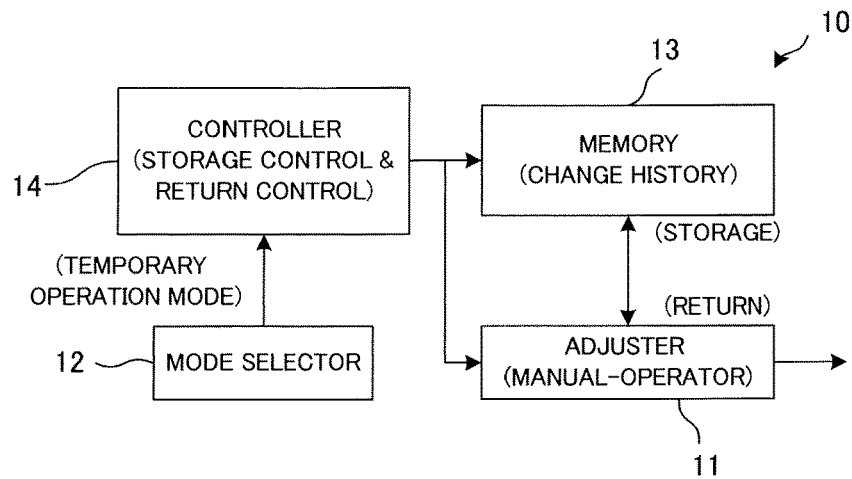
F I G. 1
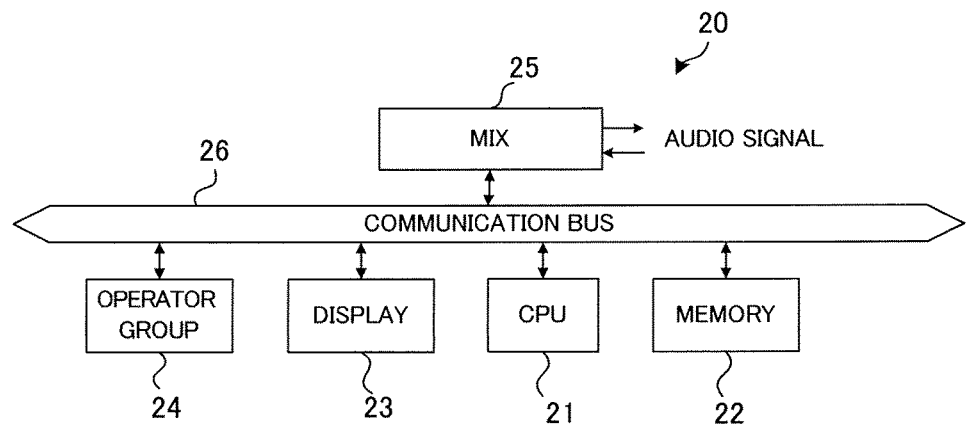
F I G. 2
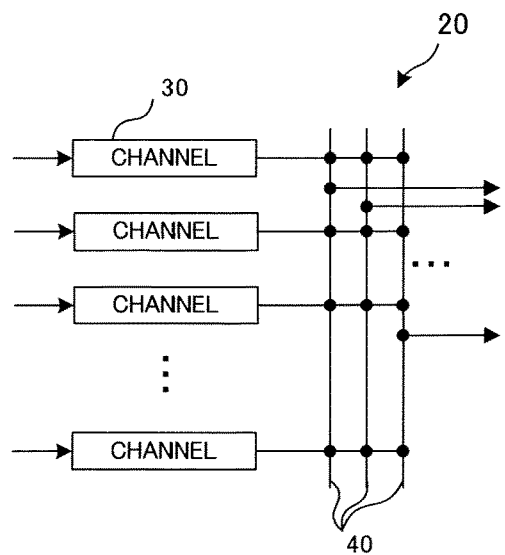
F I G. 3

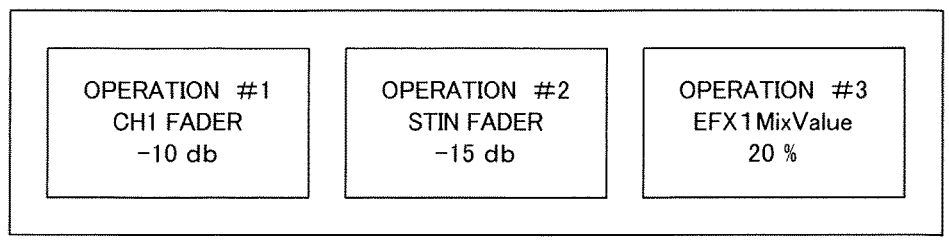
FIG. 7
| OPERATION | | | CHANGE TIMING |
|---|---|---|---|
| MODE SWITCHING | | | 0 |
| OPERATION #1 | CH1 FADER | −10dB | 500ms |
| OPERATION #2 | CH1 FADER | −15dB | 650ms |
| OPERATION #3 | STIN FADER | −15dB | 1600ms |
| OPERATION #4 | CH1 FADER | −20dB | 2500ms |
| OPERATION #5 | EFX1 MIX Value | 20% | 5300ms |
| OPERATION #6 | STIN FADER | −10dB | 7000ms |
| OPERATION #7 | EFX1 MIX Value | 30% | 8100ms |
| OPERATION #8 | STIN FADER | −5dB | 9500ms |
FIG. 8
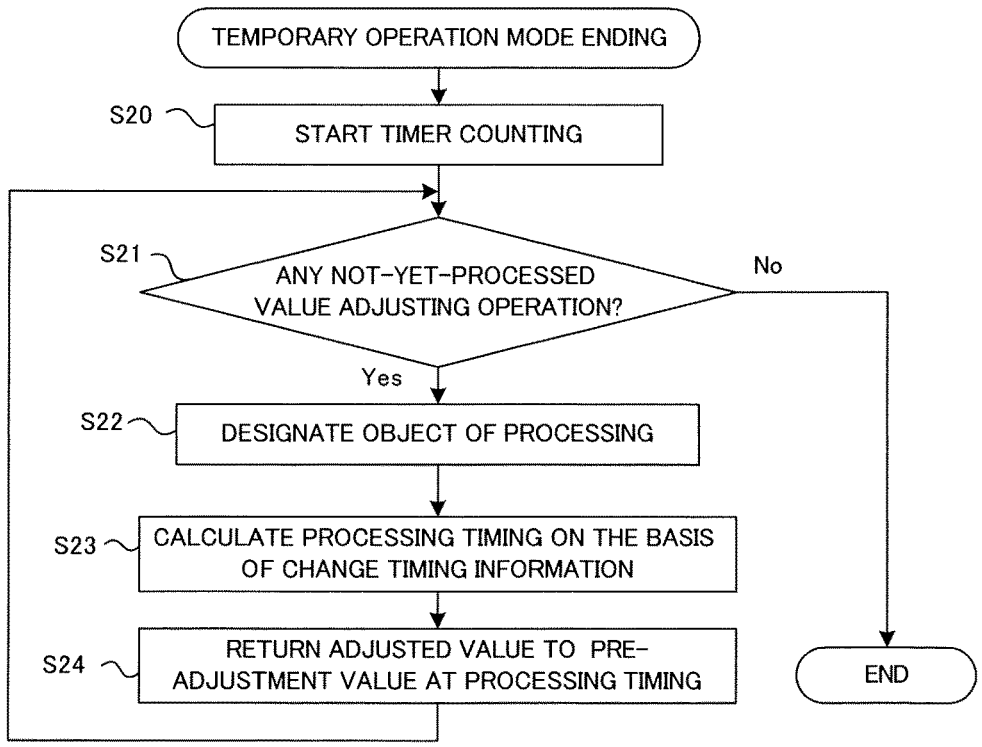
FIG. 9

PARAMETER SETTING DEVICE AND METHOD IN SIGNAL PROCESSING APPARATUS

PRIORITY

This application is based on, and claims priority to, JP PA 2016-172232 filed on 2 Sep. 2016 and International Patent Application No. PCT/JP2017/031458 filed on 31 Aug. 2017. The disclosure of the priority applications, in its entirety, including the drawings, claims, and the specification thereof, are incorporated herein by reference.

BACKGROUND

The embodiments of the present invention relate to a setting device for setting a signal adjusting parameter in a signal processing apparatus, such as an audio mixer, and method therefor.

The conventionally known audio mixers (hereinafter referred to simply as "mixers") installed, for example, in concert venues and the like are generally constructed in such a manner that each of a plurality of channels performs sound characteristic adjustment processing on an input audio or sound signal and outputs the processed sound signal selectively to buses, and that each of the buses mixes the sound signals supplied from one or more of the channels and outputs the mixed result to an output destination. Values of all parameters to be used in signal processing of such a mixer, including sound characteristic processing and sound-signal-path setting processing, performed by each of the channels, are stored in a memory of the mixer. The mixers each control the signal processing on the basis of the values of the individual parameters stored in the memory.

Some of the conventionally known mixers have a function called "scene" or "snapshot" (hereinafter referred to as "scene function"). The scene function is a function for storing all or some parameter values into the memory as one set of scene data, collectively reproducing setting states corresponding to the stored scene data by reading out the stored scene data, and the like. By preparing a plurality of types of scene data sets corresponding to various scenes, a prompt shift can be made to setting states suiting a particular scene. By preparing different scene data sets for individual music pieces in a music concert, for example, setting changes corresponding to a progression of a concert program can be made quickly. Also, by preparing different scene data sets for individual acts in a theatrical play, for example, setting changes corresponding to individual acts can be made quickly.

Further, as a way of using the mixer, it is generally a popular practice to temporarily change a value of a particular parameter and then return the parameter to the previous value (or pre-change value). In a music performance, for example, a particular rendering is employed where a degree of effectiveness of an effect, such as a reverb, is temporarily increased in an ending portion of a music piece and then the effect is returned to the previous degree of effectiveness upon ending of the performance of the music piece. Further, in a theatrical play or the like, operations are sometimes executed for turning on only a channel that processes voice of a currently speaking person with each of the other channels processing voice of the other persons temporarily turned off and then returning the turned-off channels to an ON state upon ending of the speech of the speaking person. In such cases, it has been conventional for a human operator of the mixer to return the value of the parameter in question to the previous value by manually operating a corresponding operator. Such an operation for returning the parameter to the previous value is basically a sensory operation. Thus, it is not necessarily possible for the human operator to return the parameter value to the previous value accurately and quickly. Particularly, if the human operator is of low operating skill, it is more difficult for the human operator to return the parameter value to the previous value accurately and quickly.

In executing operations for returning values of one or more parameters to respective previous values after temporarily changing the values of the parameters as noted above, it is conceivable to use the aforementioned scene function. Namely, by prestoring given setting states as scene data and reading out the scene data after values of one or more parameters are temporarily changed from the setting states, the temporarily changed values of the one or more parameters can be accurately returned to the respective pre-change values. In the case where the scene function is used, however, values of all parameters to be used in signal processing of the mixer are collectively overwritten, there would be caused the inconveniences that the process for returning the temporarily changed parameter values to the previous values takes a long time and involves an increased processing load. Further, various problems may arise due to these inconveniences; for example, the mixer may temporarily refuse to accept any further human operator's operation, or an unwanted sound cut or break may be caused in a sound signal output from the mixer. Therefore, the scene function is not suitable for a use where a value of a parameter is temporarily changed and then returned to the previous value in the middle of a live performance program of a concert, a theatrical play, or the like.

SUMMARY

In view of the foregoing prior art problems, it is one of the objects of the present invention to provide a setting device and method which enable a value of a parameter to be adjusted easily and efficiently in response to a temporary operation.

In order to accomplish the aforementioned objects, the inventive setting device for setting a signal processing parameter in a signal processing apparatus includes: a manual-operator operable by a user for adjusting a value of a parameter; a mode selector circuit that selects a temporary operation mode that is a mode for temporarily operating the manual-operator; a memory; and a processor configured to perform: a storage control task for, in association with an adjusting operation executed via the manual-operator while the temporary operation mode is selected, storing into the memory a pre-change parameter value, which is a value of the parameter before the adjusting, as a change history; and a return control task for, in response to ending of the temporary operation mode and based on the stored change history; returning the adjusted parameter value of the manual-operator to the pre-change parameter value.

The temporary operation mode is selectable via the mode selector circuit, for example, in response to a user's operation at a desired time point during operation of the signal processing apparatus. While the temporary operation mode is selected, the user can temporarily change the value of the parameter (parameter value) by temporarily operating the manual-operator. Once the user executes parameter adjustment or change by operating the manual-operator during the temporary operation mode, the parameter value before the adjustment or change (i.e., pre-adjustment or pre-change parameter value) is stored into the memory as the change history through the storage control task performed by the processor. Then, through the return control task performed by the processor, the adjusted parameter value of the manual-operator is returned to the pre-change parameter value based on the change history in response to ending of the temporary operation mode. Because the adjusted parameter value of the manual-operator is automatically returned to the pre-change parameter value (for example, to a value immediately before the start of the temporary operation mode) in response to the ending of the temporary operation mode as noted above, it is possible to not only save the trouble of returning the adjusted parameter value of the adjuster to the pre-change parameter value through a user's operation but also return the adjusted parameter value to the pre-change parameter value accurately and quickly. In this way, the operation for temporarily changing the parameter value of the manual-operator (with a view to using the manual-operator for a temporary purpose) can be executed with extreme ease. The temporary operation mode employed in the inventive setting device can be used advantageously, for example, in a construction where a plurality of parameters are to be adjusted by use of a plurality of the manual-operators, and more particularly in a case where one or some of the plurality of parameters set in the manual-operators are to be changed temporarily. Namely, once any one of the manual-operators that corresponds to a desired parameter is operated while the temporary operation mode is selected via the mode selector circuit, only the parameter set in the operated manual-operator can be temporarily adjusted or changed as desired. After that, the operation for returning the adjusted or changed parameter to the previous state (namely, the value before the adjustment or change) can be executed easily, quickly, and accurately in response to ending of the temporary operation mode. The aforementioned operations can be executed efficiently with the inventive arrangements because the values of all of the plurality of parameters do not have to be stored as a set of scene data. As a result, with the inventive arrangements, the operations for temporarily changing the value of a desired parameter and then returning the parameter to the pre-change value can be executed easily, quickly, and accurately, and thus, parameter adjustment intended by the user can be carried out in an efficient manner.

Note that the ending of the temporary operation mode may be executed by use of any desired technique and that the scope of the present invention is not limited by a particular technique for ending the temporary operation mode. For example, arrangements may be made such that starting (turning-ON) and ending (turning-OFF) of the temporary operation mode can be switched alternately in response to each user's operation of the mode selector executed in a toggle-like or other switching fashion.

The disclosure made herein also embraces a method that includes steps corresponding to the individual elements constituting the aforementioned setting device. Also disclosed herein is a computer-readable, non-transitory storage medium storing a group of instructions executable by one or more processors for performing the aforementioned method.

BRIEF DESCRIPTION OF DRAWINGS

Certain embodiments of the present invention will hereinafter be described in detail, by way of example only, with reference to the accompanying drawings, in which:

FIG. 1 is a conceptual block diagram illustrating an example construction of a setting device;

FIG. 2 is a block diagram illustrating an example electric hardware construction of an audio mixer having the setting device of FIG. 1 applied thereto;

FIG. 3 is a block diagram illustrating an example construction of signal processing performed in the audio mixer of FIG. 2;

FIG. 7 is a diagram illustrating an example of a change history list;

FIG. 8 is a diagram illustrating another example of the change history list which includes change timing information; and FIG. 9 is a flow chart illustrating an example of processing for returning a value of each parameter adjusted during a temporary operation mode to a pre-adjustment value at a processing timing based on the corresponding change timing information.

DETAILED DESCRIPTION

Figure 4:
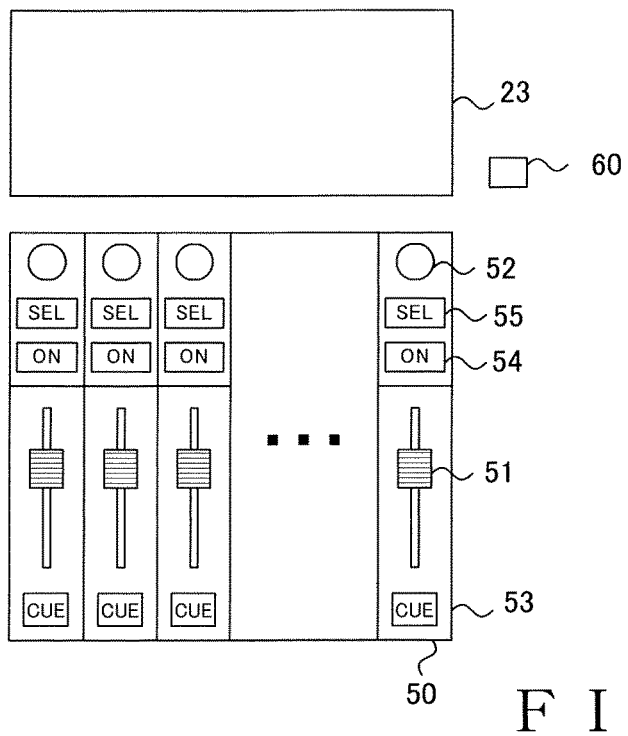
FIG. 4 is a diagram illustrating an example construction of an operation panel of the audio mixer of FIG. 2.

FIG. 1 is a conceptual block diagram explanatory of an example construction of a setting device 10 provided in a signal processing apparatus. In FIG. 1, the setting device 10 includes: an adjuster 11; a mode selector 12; a memory 13; and a controller 14. The adjuster 11 comprises a manual-operator operable by a user or human operator to adjust a value of a parameter. The mode selector 12 comprises a mode selector circuit that selects a temporary operation mode that is a mode for temporarily operating the adjuster 11 (namely, the manual-operator). The controller 14 comprises a processor configured to perform: storage control (namely, storage control task) for, in association with an adjusting operation executed via the adjuster (manual-operator) 11 while the temporary operation mode is selected, storing a pre-change parameter value, which is a value of the parameter before the adjusting or adjustment, into the memory as a change history; and return control (namely, return control task) for returning the adjusted parameter value of the adjuster (manual-operator) 11 to the pre-change parameter value based on the change history in response to ending of the temporary operation mode.

The signal processing apparatus to which the setting device 10 of FIG. 1 is applied is acoustic equipment, such as an audio mixer, which handles audio or sound signals. The following embodiments will be described in relation to a case where the sound signal processing apparatus 10 to which the setting device 10 is applied is an audio mixer 20 (hereinafter also referred to as "mixer"). Let it be assumed here that the audio mixer 20 is a digital mixer that processes sound signals exclusively through digital signal processing.

FIG. 2 is a block diagram illustrating an example electric hardware construction of the mixer 20. The mixer 20 includes a CPU (Central Processing Unit) 21, a memory 22, a display 23, an operator group 24, and a mixing section ("MIX" in the FIG. 25, and these components 21 to 25 are interconnected via a bus 26.

The CPU 21 controls the mixer 20 by executing various programs stored in the memory 22. The memory 22 not only non-volatilely stores various programs to be executed by the CPU 21, various data, etc., but also is used as a loading area for loading programs to be executed by the CPU 21 and as a working area. The memory 22 may be constructed by combining, as necessary, various memory devices, such as a read-only memory, a random-access memory, a flash memory, and a hard disk. A portion of a storage area of the memory 22 functions as the memory 13 for storing the above-mentioned change history.

The display 23 displays various information, which is based on display control signals given from the CPU 21, in various images, character strings, and the like. The operator group 24 includes a plurality of operators disposed on an operation panel of the mixer 20, interface circuits related to the operators, and the like. The operator group 24 includes: a plurality of fader operators; rotary knob operators to be used for equalization, pan adjustment and the like; and a later-described switch for switching between operation modes. Of the plurality of operators included in the operator group 24, operators for adjusting or setting various parameters of audio signals are not only operable manually by the user or human operator but also operable automatically by electric drivers, such as motors. The user uses the operator group 24 to execute various operations that include operations for setting sound signal paths, values of various parameters, and the like. The CPU 21 acquires each detection signal corresponding to a user's input operation executed on the operator group 24 or the display 23 and controls the behavior of the mixer 20 on the basis of the acquired detection signal. Of the plurality of operators included in the operator group 24, each of the operators for adjusting or setting various parameters of sound (or audio) signals corresponds to the aforementioned adjuster (namely, manual-operator) 11.

The mixing section 25 is constituted, for example, by a DSP (Digital Signal Processor), the CPU 21, and a signal processing arithmetic device that is implemented virtually by software stored in the memory 22. The mixing section 25 processes one or more sound signals, supplied from not-shown input equipment, by executing a signal processing program, and then the mixing section 25 outputs the processed sound signals to not-shown output equipment. A portion of a storage area of the memory 22 functions as a current memory, and various parameters to be used for the signal processing by the mixing section 25 are stored in the current memory. Thus, the signal processing by the mixing section 25 is controlled on the basis of values of the various parameters stored in the current memory of the memory 22. The values of the various parameters stored in the current memory are updated in response to operations of corresponding operators in the operator group 24.

FIG. 3 is a block diagram illustrating an example construction of the signal processing performed by the mixing section 25. As shown in FIG. 3, the mixer 20 includes a plurality of channels 30 and a plurality of buses 40. Each of the channels 30 performs various signal processing, including volume adjustment, on an input sound signal and supplies the processed sound signal to one or more of the buses 40 selected by the human operator. Each of the buses 40 mixes sound signals supplied from one or more of the channels 30 and outputs the mixed sound signal via a corresponding output channel (not shown). The human operator of the mixer 20 uses the operator group 24 to execute operations for adjusting values of various signal processing parameters of the individual channels 30 and setting sound signal paths including connections between the individual channels 30 and the individual buses 40. In response to such human operators operations of the operators included in the operator group 24, the CPU 21 changes the values of the parameters stored in the memory 22.

FIG. 4 illustrates an example construction of the operation panel of the mixer 20. The operation panel includes a plurality of channel strips 50. Each of the channel strips 50 includes: a fader operator 51 for adjusting volume; a rotary operator 52 to which a desired parameter is assignable; an OF/OFF switch 53 to a CUE bus; a channel ON/OFF switch 54, and a channel selection switch 55. Any one of the channels 30 is assigned to each of the channel strips 50 as a corresponding object of operation of the channel strip 50. The human operator can use the various operators of each of the channel strips 50 to adjust the values of various parameters, such as volume, of the channel 30 assigned to the channel strip 50. The various operators 51 to 55 of each of the channel strips 50 are included in the operator group 24 of FIG. 2. The operation panel also includes the display 23, and the display 23 displays various information, such as the values of the various parameters.

When the value of a given parameter adjusted by a user's adjusting operation is to be returned to the value before the adjustment or pre-adjustment (pre-change) value (also referred to as "previous value" or "previous state") in the mixer 20, it is difficult to return the adjusted value to the previous value quickly and accurately through a manual operation. Such a difficulty is serious particularly in a case where the values of a plurality of parameters are adjusted and then the adjusted values of all of the parameters are to be returned to the previous values. To solve such a problem, the mixer 20 according to the present embodiment is configured to enable selection of the temporary operation mode for temporarily operating the operator group 24. As will be described in detail later, while the temporary operation mode is selected (i.e., during a period from the start to end of the temporary operation mode), the user can operate any one of the operators in the operator group 24 to temporarily adjust as desired the value of the parameter corresponding to the operated operator, and then the user can return the temporarily adjusted value of the parameter to the pre-adjustment value easily, quickly, and accurately.

For convenience of description, a state in which the temporary operation mode is not selected will hereinafter be referred to as "normal operation mode". Note, however, that the mixer 20 is constructed to accept a users operation of each of the operators (namely, adjusters 11) in the operator group 24 irrespective of whether the mixer 20 is in the normal operation mode or in the temporary operation mode. Thus, the mixer 20 may be constructed in such a manner that an operating feeling which the user has in operating the operator group 24 does not differ whether the mixer 20 is in the normal operation mode or in the temporary operation mode. The term "temporary operation mode" means a special operation mode in which, by the temporary operation mode being started with a user's intention or in such a manner that the user can perceive the start of the temporary operation mode, the user is enabled to temporarily operate any one of the operators (namely, adjusters 11) in the operator group 24 so as to temporarily adjust the value of the parameter corresponding to the one operator. In the case of the inventive setting device, the term "temporary operation" has a nature of a transient operation because the adjusted state of the parameter is returned to the previous state of the parameter, namely, the operation executed during the temporary operation mode is automatically ended, upon ending of the temporary operation mode.

As an example, the operation panel of the mixer 20 includes a mode switching switch 60 for switching between the operation modes. The mode switching switch 60 functions as the above-mentioned mode selector 12 (or a manual-operator for the mode selector circuit) for selecting the temporary operation mode. The mode switching switch 60 is implemented, for example, by an unlatch-type push button switch which starts the temporary operation mode in response to a user's depression operation of the switch and maintains the temporary operation mode while the user's depression operation is maintained, and which, upon ending of the user's depression operation, ends the temporary operation mode and returns the operation mode to the normal operation mode.

As another example, the mode switching switch 60 is implemented by a latch-type push button switch which is switched on and maintained in the switch-ON state in response to a user's depression operation of the switch 60 and switched off once it is depressed again. In this case, the temporary operation mode is started and maintained by the mode switching switch 60 being operated during the normal operation mode. The temporary operation mode is ended and the operation mode is returned to the normal operation mode by the mode switching switch 60 being operated during the temporary operation mode.

The mode switching switch 60 may be either a switch dedicated to operation mode switching, or a general-purpose switch ("User Defined Key") to which any desired function is assignable by the user.

Figure 5:
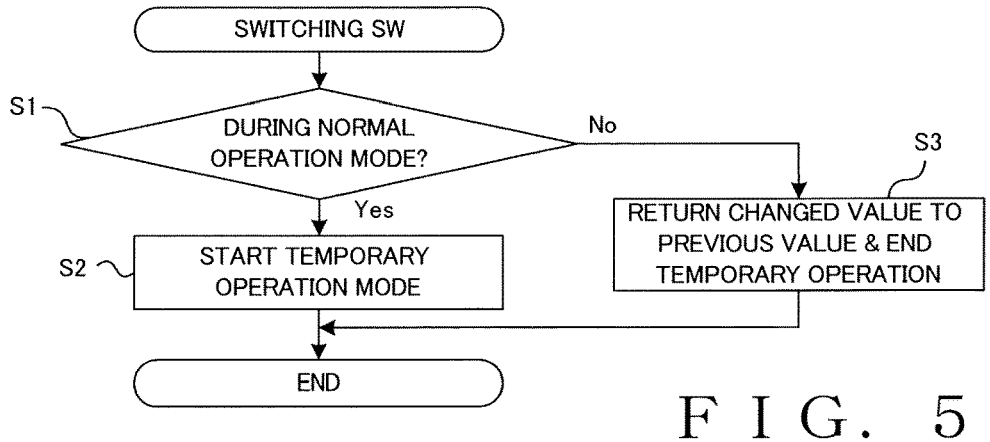
FIG. 5 is a flow chart illustrating an example of operation mode switching processing.
Figure 6:
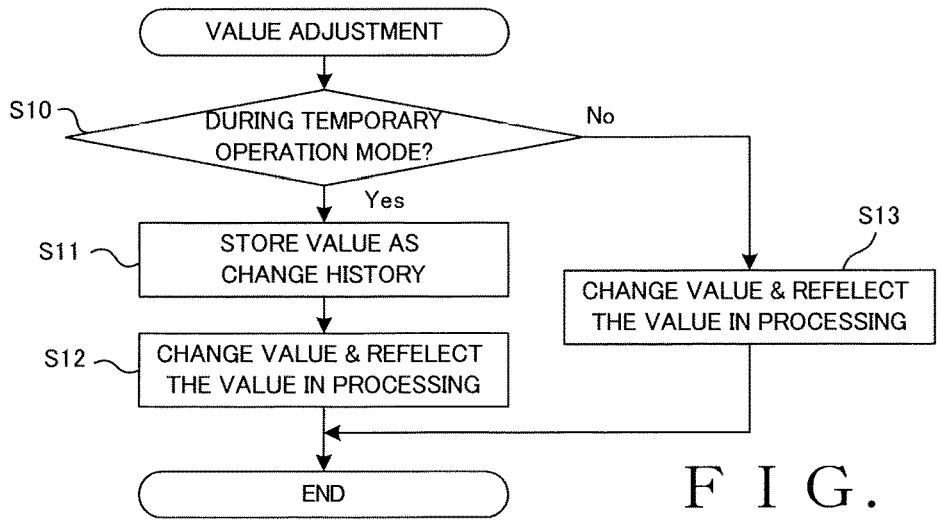
FIG. 6 is a flow chart illustrating an example of parameter value adjusting processing.

FIGS. 5 and 6 are flow charts explanatory of an example of parameter value adjustment processing using the aforementioned temporary operation mode. The CPU 21 of the mixer 20 detects, every predetermined cycle, whether or not any one of the operators of the operator group 24 has been operated. The CPU 21 performs processing of FIG. 5 upon detection of an operation of the mode switching switch 60, and the CPU 60 performs the processing of FIG. 6 upon detection of any value adjusting operation on the channel strips 50. Upon detection of a human operator's operation of the mode switching switch 60 when the current operation mode is the normal operation mode (Yes determination at step S1), the CPU 21 switches the operation mode from the normal operation mode to the temporary operation mode and starts the temporary operation mode (step S2). The operation of step S2 performed by the CPU 21 corresponds to selecting (starting or turning on) the temporary operation mode in response to the human operator's operation of the mode switching switch 60. Then, the operator group 24 in the mixer 20 is maintained in the temporary operation mode until the temporary operation mode is ended at step S3 to be described later.

Once the human operator executes an operation for adjusting the value of any one of the parameters during the temporary operation mode (Yes determination at step S10 of FIG. 6), the CPU 21 stores the value of the one parameter before being adjusted in response to the value adjusting operation (namely, the value stored in the current memory of the memory 22 as the current value of the parameter) into the memory 22 as the change history (step S11). After storing, as the change history, the current value stored in the current memory as noted above, the CPU 21 changes (i.e., updates) the current value of the parameter in the current memory to a value corresponding to the current adjusting operation (step S12), and then the CPU 21 ends the processing of FIG. 6. By the stored content of the current memory being updated through the operation of step S12 as noted above, the adjusted result of the value of the parameter is reflected in the signal processing that is performed by the mixing section 25. Note that the value adjusting operation that triggers the processing of FIG. 6 may be any type of parameter value adjusting operation relating to the signal processing by the mixing section 25, namely, any type of parameter value adjusting operation that causes an acoustic change. A storage area for storing the change history in the memory 22 corresponds to the memory 13 of FIG. 1. The aforementioned operation of step S11 performed by the CPU 21 corresponds to the storage control task performed by the controller (namely, processor) 14 of FIG. 1. Further, the aforementioned operation of step S12 performed by the CPU 21 corresponds to parameter value adjustment responsive to a user's operation of the adjuster (namely, manual-operator) 11 of FIG. 1.

If a plurality of value adjusting operations have been executed while the temporary operation mode is selected, the CPU 21 performs the aforementioned operation of step S11 for each of the executed value adjusting operations. Namely, change histories for all of the value adjusting operations, executed while the temporary operation mode is selected or ON in a given period of time, are stored into the memory 22 as a single change history list. Note that one value adjusting operation refers to an operation that lasts from a time point when the operator corresponding to the parameter in question starts to be moved to a time point when the parameter value adjusted by the movement of the operator is established. For example, one value adjusting operation refers to an operation in which the knob portion of the fader of a given channel is moved from a position of −10 dB to a position of −15 dB and then the movement of the knob portion of the fader is stopped.

FIG. 7 shows an example of the change history list stored in the memory 22. FIG. 7 shows the change history list stored in a case where first, a fader level of a channel CH1 was adjusted, then a fader level of another channel STIN1 was adjusted, and then a mix level of an effecter (EFX1) was adjusted. The change history list of FIG. 7 includes, in association with the individual value adjusting operations: information identifying the individual value adjusting operations ("OPERATION #1", "OPERATION #2", and "OPERATION #3" in the figure); information identifying individual parameters adjusted by the value adjusting operations ("CH1 FADER", "STIN1 FADER", and "EFX1 MIX Value" in the figure); and values of the parameters before being subjected to the adjustment responsive to the value adjusting operations ("−10 dB", "−15 dB", and "20%" in the figure). As an example, the information identifying the individual value adjusting operations includes numbers indicative of an order (i.e., order of adjustment) in which the value adjusting operations were executed. Namely, the change history list includes information identifying the order of adjustment of the values of the parameters.

Once the mode switching switch 60 is operated during the temporary operation mode (No determination at step S1 of FIG. 5), the CPU 21 determines that ending or turning-off of the temporary operation mode has been instructed by the user, and then the CPU 21 goes to step S3 of FIG. 5 to end the temporary operation mode. Namely, at step S3, the CPU 21 returns the value of the parameter, adjusted during the temporary operation mode, to the value before the adjustment (pre-adjustment value) on the basis of the change history stored at step S11 above. At this time, if the operator associated with the value of the parameter is an operator (electric operator) whose knob portion is automatically controllable in position, such as a moving fader, the CPU 21 automatically controls the position of the knob portion of that operator in accordance with a change of the parameter value. Then, the CPU 21 ends the temporary operation mode by switching the operation mode from the temporary operation mode to the normal operation mode (step S3). The operation performed by the CPU 21 for ending the temporary operation mode may include deleting the change history list from the memory 22. By merely ending the temporary operation mode (switching the operation mode from the temporary operation mode to the normal operation mode) as noted above, the human operator of the mixer 20 can return the value of each parameter, adjusted during the temporary operation mode, to the corresponding pre-adjustment value easily, quickly, and accurately. As an example, if the change history list has the value of each of the parameters at the start point of the temporary operation mode stored therein, the human operator can return the value of each of the parameters, adjusted during the temporary operation mode, to the corresponding value before the start of the temporary operation mode, by merely switching the operation mode back to the normal operation mode. The operation performed by the CPU 21 at step S3 corresponds to the return control task performed by the controller (namely, processor) 14 of FIG. 1. Arrangements may be made such that, if the operator corresponding to the value of the parameter in question is not an automatically controllable operator, the previous operating position, to which the operator is to be returned, may be displayed, instructed, or otherwise in such a manner that the user can be prompted to manually operate the operator in accordance with the display, instruction or the like so as to quickly return the operator to the previous operating position.

As an example, the CPU 21 sequentially returns the values of the individual parameters to the respective pre-adjustment values on the basis of the order of adjustment in which the values of the parameters were adjusted during the temporary operation mode. For example, the CPU 21 sequentially returns the values of the parameters in the same order as the order of adjustment in which the values of the parameters were adjusted during the temporary operation mode (namely in the order of "OPERATION #1", "OPERATION #2", and "OPERATION #3" in the illustrated example of FIG. 7). More specifically, in the illustrated example of FIG. 7, the CPU 21 first returns the fader level of channel CH1 to "−10 dB", then returns the fader level of channel STIN1 to "−15 dB", and then returns the mix level of EFX1 to "20%". As another example, the CPU 21 sequentially returns the values of the parameters in an order opposite the order of adjustment in which the values of the parameters were adjusted during the temporary operation mode (namely, in the order of "OPERATION #3", "OPERATION #2", and "OPERATION #1" in the illustrated example of FIG. 7). More specifically the CPU 21 first returns the mix level of EFX1 to "20%", then returns the fader level of channel STIN1 to "−15 dB", and then returns the fader level of channel CH1 to "−10 dB". As understood from the foregoing, the return control task performed at step S3 may comprise temporarily sequentially reproducing one or more parameter values, corresponding to one or more adjusting operations executed during the temporary operation mode, as parameter values of the adjusters, on the basis of the change histories stored in the memory, i.e., in the order of the respective change histories.

As another example of step S3, the CPU 21 may return the values of the plurality of parameters, adjusted during the temporary operation mode, to the respective pre-adjustment values stored as the change histories, irrespective of the order of adjustment. For example, the CPU 21 may return the values of the plurality of parameters, adjusted during the temporary operation mode, to the respective pre-adjustment values all together at the same time (in a simultaneous parallel manner). As still another example, the CPU 21 may return the values of the plurality of parameters, adjusted during the temporary operation mode, to the respective pre-adjustment values in the order of the channel numbers. In the case where the fader level of channel 1, the fader level of channel 2, and the fader level of channel 3 were adjusted, for example, the CPU 21 returns the fader levels to the respective pre-adjustment values in the order of the channel numbers 1, 2, and 3 or in the order of the channel numbers 3, 2, and 1; in other words, the CPU 21 returns the fader level values to the respective pre-adjustment values in an order of arrangement of the channel strips 50 on the operation panel of the mixer 20 (i.e., in a right-to-left order or in a left-to-right order).

As still another example, the CPU 21 may change, at step S3 above, the value of each parameter adjusted during the temporary operation mode gradually to the pre-adjustment value. As an example, the CPU 21 may change the value of the parameter adjusted during the temporary operation mode gradually to the pre-adjustment value through a low-pass filter process. In the case where the pre-adjustment value stored as the change history is "−10 dB" and the fader level value having been adjusted during the temporary operation mode is "5 dB", sound volume would change rapidly if the fader level value is changed from "5 dB" to "−10 dB". For this reason, the CPU 21 changes the fader level value gradually (continuously or over a plurality of steps) from "5 dB" to "−10 dB", for example, through a low-pass filter process. In this way, it is possible to prevent sound characteristics, such as volume, of a sound signal processed by the mixing section 25 from changing rapidly.

When an operation for adjusting a value of a parameter has been executed during the normal operation mode (No determination at step S10 of FIG. 6), the CPU 21 changes, in response to the value adjusting operation, the value of the corresponding parameter stored in the current memory of the memory 22 (step S13 of FIG. 6) and then ends the processing of FIG. 6. In this case, the CPU 21 does not perform the operation for storing the pre-adjustment value as the change history.

A change history list according to another embodiment includes change timing information indicative of timings at which individual value adjusting operations were executed, i.e., timings at which adjustment of values of parameters was made. FIG. 8 shows an example of such a change history list which includes change timing information and in which change histories of eight value adjusting operations, "OPERATION #1" to "OPERATION #8", are recorded. In this change history list, change timing information indicative of the change timings of the individual value adjusting operations is recorded in association with the change histories of the value adjusting operations. For example, the change timing information of each of the value adjusting operations indicates, in units such as milliseconds ("ms" in FIG. 8), an elapsed time (absolute time) from a start time point of the temporary operation mode (namely, from a time point when an operation for switching the operation mode to the temporary operation mode was executed to a time point when the value adjusting operation was executed).

As an example, once an operation for switching the operation mode to the temporary operation mode is executed, the CPU 21 at step S2 of FIG. 5 records information indicating that a mode switching operation (namely, temporary-operation-mode starting instruction) has been executed (given) into the memory 22 as a change history, stores change timing information "0 ms" in association with the change history, and then starts time counting by use of a timer. The timer counts time, for example in milliseconds, an elapsed time from the start time point of the temporary operation mode. Then, once a value adjusting operation is executed during the temporary operation mode (Yes determination at step S10 of FIG. 6), the CPU 21 stores, as the change history, a value of the parameter in question before being subjected to adjustment responsive to the value adjusting operation and records, as the change timing information corresponding to the change history, the elapsed time counted by the timer (step S11 above). Thus, in this example, the change timing information indicates the elapsed time (absolute time) from the start time point of the temporary operation mode to the time point when the value adjusting operation was executed. The processing of FIG. 6 is repeated for each value adjusting operation executed during the temporary operation mode, and thus, the change histories and the change timing information are recorded for eight value adjusting operations, "OPERATION #1" to "OPERATION #8", executed during the temporary operation mode; for example, change timing information "500 ms" is recorded in association with the change history of "OPERATION #1", change timing information "650 ms" is recorded in association with the change history of "OPERATION #2", and so on. In this manner, a single change history list including the change timing information as shown in FIG. 8 is created.

With the change history list including the change timing information as shown in FIG. 8, the CPU 21 can return the value of each of the parameters adjusted during the temporary operation mode to the pre-adjustment value at a processing timing based on the corresponding change timing information. FIG. 9 is a flow chart illustrating an example of processing for returning the value of each of the parameters adjusted during the temporary operation mode to the pre-adjustment value at a processing timing based on the corresponding change timing information. Once the human operator operates the mode switching switch 60 during the temporary operation mode, i.e., once the human operator executes an operation for ending the temporary operation mode (No determination at step S1 of FIG. 5 above), the CPU 21 performs the processing of FIG. 9 at step S3 of FIG. 5. At step S20 of FIG. 9, the CPU 21 starts time counting by use of the timer. For instance, the timer counts an elapsed time (e.g., absolute time) from a time point when ending of the temporary operation mode was instructed. At next step S21, the CPU 21 determines whether or not there is any not-yet-processed value adjusting operation in the change history list. If there is no value adjusting operation recorded in the change history list (No determination at step S21), such as when no value adjusting operation was executed during the temporary operation mode, the CPU 21 ends the processing of FIG. 9. If there are one or more not-yet-processed value adjusting operation in the change history list (Yes determination at step S21), the CPU 21 proceeds to step S22, where, on the basis of the change history list, the CPU 21 designates, one by one, each of the value adjusting operations, executed during the temporary operation mode, as an object of processing in the order opposite the order of adjustment. Thus, first, OPERATION #8 is designated as an object of processing.

At step S23, the CPU 21 calculates, on the basis of the change timing information of the value adjusting operation designated as the object of processing, a timing (referred to as "processing timing") at which the value of the parameter in question is to be returned to the pre-adjustment value. The processing timing indicates a timing at which the value of the parameter is to be returned to the pre-adjustment value, for example, by an elapsed time (absolute time) from the time point when the ending of the temporary operation mode was instructed. For example, such a processing timing can be calculated based on a difference between the change timing information (absolute time) of "OPERATION #8" recorded in the lowest row of the change history list (namely, executed last of the value adjusting operations) and the change timing information (absolute time) of the object of processing in question. When "OPERATION #8" is the object of processing, for example, the processing timing of "OPERATION #8" is 0 ms.

Once the elapsed time counted by the timer reaches the calculated processing timing, the CPU 21 returns the adjusted value of the parameter in question to the pre-adjustment value (namely, pre-change value) on the basis of the change history of the value adjusting operation designated as the object of processing (step S24). The CPU 21 repeats steps S22 to S24 until the processing is completed for all of the value adjusting operations in the change history list (namely, as long as a Yes determination is made at step S21). Then, once the processing is completed for all of the value adjusting operations in the change history list (namely, once a No determination is made at step S21), the CPU 21 ends the processing of FIG. 9.

Namely, the CPU 21 returns the fader value of STIN to −5 dB on the basis of the change history of OPERATION #8 at the time point when the time count of the timer is 0 ins. Then, the CPU 21 designates OPERATION #7 as the next object of processing (step S22) and then calculates a processing timing "1400 ms" of OPERATION #7 on the basis of a difference between the respective change timing information of OPERATION #8 and OPERATION #7 (step S23 above). Then, once a lapse of 1400 ms is counted by the timer, the CPU 21 returns the mix level of EFX1 to 30% (step S24). After that, the CPU 21 designates OPERATION #6 as the next object of processing (step S22) and then calculates a processing timing "2500 ms" of OPERATION #6 on the basis of a difference between the respective change timing information of OPERATION #8 and OPERATION #6 (step S23 above). Then, once a lapse of 2500 ms is counted by the timer, the CPU 21 returns the fader of STIN to −10 dB (step S24). In the aforementioned manner, the CPU 21 can return the values of all of the parameters corresponding to "OPERATION #8" to "OPERATION #1" to the respective pre-adjustment values in the order opposite the order of adjustment and at processing timings corresponding to the respective change timings of "OPERATION #8" to "OPERATION #1". By reflecting the timings at which the individual value adjusting operations were executed in the processing for returning the values of the parameters to the respective pre-adjustment values as noted above, it is possible to perform the processing for returning the values of the parameters to the respective pre-adjustment values in such a manner that the value adjusting operations are reproduced in the opposite direction. In this case, the processing for returning the values of the parameters to the respective pre-adjustment values can be performed as if the values of the parameters were returned to the previous values through manual operations. For example, the processing for returning the values of the parameters to the respective pre-adjustment values is performed quickly if each of the value adjusting operations was executed quickly, and such parameter value returning processing is performed slowly if each of the value adjusting operations was executed slowly. By returning the values of the parameters to the respective pre-adjustment values at the processing timings corresponding to the respective change timings as noted above, the way of returning the values of the parameters can be made more elaborate in terms of musical or acoustic effects.

Namely, the return control task performed at step S3 may comprise sequentially reproducing one or more pre-adjustment parameter values, corresponding to one or more value adjusting operations executed during the temporary operation mode, as parameter values of the adjusters in the order opposite the order of the change histories. In this case, the parameter values of the individual adjusters are ultimately returned by the return control task to the respective values immediately before the start of the temporary operation mode (namely, for "CH1 Fader", to the value stored in association with OPERATION #1; for "STIN Fader", to the value stored in association with OPERATION #3; and for "EFX1 _MIX_Value", to the value stored in association with OPERATION #5).

As a modified example of the aforementioned return control task, the processing timing calculated at step S23 above may be a time interval (relative time) between the timing of the value adjusting operation designated as the object of processing and the timing of the value adjusting operation immediately preceding the value adjusting operation designated as the object of processing. In this case, the processing timing of OPERATION #8 is "0 ms" because there is no value adjusting operation immediately preceding OPERATION #8, the processing timing of OPERATION #7 is a difference "1400 ms" between the change timing of OPERATION #8 (9500 ms) and the change timing of OPERATION #7 (8100 ms), the processing timing of OPERATION #6 is a difference "1100 ms" between the change timing of OPERATION #7 (8100 ms) and the change timing of OPERATION #6 (7000 ms), and so on. In this case, at step S24 of FIG. 9, the CPU 21 counts, by using the timer, an elapsed time from the last time the operation of step S24 was performed and thereby determines whether or not the processing timing (relative time) has been reached.

As another modified example, the CPU 21 may record, at step S11 of FIG. 6 above, an time interval (relative time) between two successive value adjusting operations as the change timing information to be associated with the change history recorded during the temporary operation mode. The change timing information (relative time) of a given value adjusting operation is, for example, a time interval between the given value adjusting operation and another value adjusting operation immediately preceding the given value adjusting operation. Such a time interval (relative time) can be calculated on the basis of an absolute time counted by the timer. Alternatively, the timer may itself count the above-mentioned time interval (relative time). In such a case, at step S23 of FIG. 9, the CPU 21 calculates a processing timing of the value adjusting operation, i.e., current object-of-processing value adjusting operation, on the basis of the change timing information of another value adjusting operation immediately following (namely, designated as the object of processing immediately before) the current object-of-processing value adjusting operation. As still another example, a time interval between a given value adjusting operation and another value adjusting operation immediately following the given value adjusting operation may be recorded as the change timing information (relative time). In such a case, the change timing information of the given value adjusting operation is used directly as the processing timing of the given value adjusting operation.

Further, as still another example of the return control task, the CPU 21 at step S22 may designate, one by one, the value adjusting operations as objects of processing in the same order as the order of adjustment on the basis of the change history list. In this case, the CPU 21 returns the values to the respective pre-adjustment values in the order of OPERATION #1, OPERATION #2, . . . , OPERATION #7, and OPERATION #8 and in accordance with the processing times based on the change timing information. Namely, the return control task performed at step S3 may comprise sequentially reproducing one or more pre-change (pre-adjustment) parameter values, corresponding to the one or more value adjusting operations executed during the temporary operation mode, as parameter values of the adjusters in the same order as the order of the change histories. In this case, the parameter values of the individual adjusters are ultimately returned by the return control task to the respective values stored in association with the last operations executed on the faders during the temporary operation mode (namely, OPERATION #1 for "CH1 Fader", OPERATION #8 for "STIN Fader", and OPERATION #7 for "EFX1_MIX_Value"). Even with such return control using or following the same order as the order of the change histories, if only one value adjusting operation has been executed for a same parameter type, the adjusted parameter value of the fader is returned, in response to ending of the temporary operation mode, to the parameter value immediately before the start of the temporary operation mode.

As a modified example of the return control task following the same order as the order of the change histories, in a case where a plurality of value adjusting operations have been executed for a same parameter type during the temporary operation mode, only the value stored in association with the oldest value adjusting operation may be returned to the corresponding adjuster. In the case of the change histories shown in FIG. 8, for example, only the values stored in association with OPERATION #1, OPERATION #3, and OPERATION #5 are returned to the respective adjusters in the same order as the order of the change histories and in accordance with processing timings based on the change timing information. Thus, even with such return control following the same order as the order of the change histories, the adjusted parameter values of the individual adjusters are returned to the respective values immediately before the start of the temporary operation mode (namely, to the value stored in association with OPERATION #1 for "CH1 Fader", to the value stored in association with OPERATION #3 for "STIN Fader", and to the value stored in association with OPERATION #5 for "EFX1_MIX_Value").

As still another example, the change timing information may further include information indicative of a characteristic of movement, such as an operating velocity, of the value adjusting operation. In this case, the CPU 21 can return, at step S3 (more specifically, through the processing of FIG. 9), the temporarily adjusted value of the parameter can be returned to the pre-adjustment value at a velocity corresponding to the value adjusting operation executed by the human operator. For example, if the human operator moved the operator quickly, the value of the corresponding parameter is returned to the pre-adjustment value quickly, while if the human operator moved the operator slowly, the value of the corresponding parameter is returned to the pre-adjustment value slowly. In this way, the way of returning the value of the parameter can be made more elaborate in terms of musical or acoustic effects.

As another embodiment, the change history list may be one where only a value of a parameter at a start point of the temporary operation mode is recorded. In other words, step S11 above may be performed only when a value of the parameter in question is adjusted for the first time after the start of the temporary operation mode. If a value of a parameter at least at a start point of the temporary operation mode is recorded as above, the adjusted value of the parameter in question can be returned to the recorded value at the start point of the temporary operation mode upon ending of the temporary operation mode.

As still another embodiment, rules for prescribing ways of returning values that correspond to parameter types (namely, shift rules corresponding to the parameter types) may be prepared or defined in advance, and at step S23 above, the CPU 21 may return a value of a parameter, adjusted during the temporary operation mode, to the corresponding pre-adjustment value in accordance with one of the rules that corresponds to the type of the parameter in question. Examples of the above-mentioned rules prescribing the ways of returning values that correspond to the parameter types include a rule in accordance with which an adjusted value of a fader level is returned (namely, shifted) gradually from a value at the end time of the temporary operation mode to a value before the adjustment (at the start time of the temporary operation mode), a rule in accordance with which an adjusted value of a parameter relating to a reverb effect is returned (namely, shifted) from a value at the end time of the temporary operation mode directly to a value before the adjustment, and the like. In this way, adjusted values of parameters can be returned to the respective pre-adjustment values in appropriate ways corresponding to the types of the parameters.

Further, as still another embodiment, rules prescribing ways of returning values (namely, shift rules) may be prepared or defined in advance in association with various performance program types to which the mixer 20 (namely, signal processing apparatus) is applicable, and at step S3 above, the CPU 21 may return values of parameters, adjusted during the temporary operation mode, in accordance with a selected one of the performance program types. Examples of such performance program types to which the mixer 20 (namely, signal processing apparatus) is applicable to include a music concert, a theatrical play stage, a conference, and the like. Examples of the above-mentioned rules prescribing the ways of returning values that correspond to the performance program types include a rule prescribing a way of returning an adjusted parameter value to a pre-adjustment value in a music concert, a rule prescribing a way of returning an adjusted parameter value to a pre-adjustment value in a theatrical play stage, and a rule prescribing a way of returning an adjusted parameter value to a pre-adjustment value in a conference. In this way, values of parameters can be returned to respective pre-adjustment values in appropriate ways corresponding to the types of the performance program types.

As still another embodiment, the rule (shift rule) for returning an adjusted parameter value to a pre-adjustment value at step S3 above may be set as desired by the user.

By using such rules prescribing ways of returning values of parameters as noted above, the ways of returning values of parameters can be made even more elaborate in terms of musical or acoustic effects.

As still another embodiment, a manual-operator or switch for the mode selector (namely, mode selector circuit) 12 may be constituted by a switch image displayed on the display 23. The display 23 is constructed, for example, as a touch panel display. Switch images corresponding to various parameters of each of the channel strips 50, for example, are displayed on the display 23. While the human operator is touching any one of the switch images, only the parameter corresponding to the touched switch image is maintained in the "temporary operation mode". Once the human operator operates, on the operation panel, a physical operator (such as the fader operator 51) corresponding to the parameter that in turn corresponds to the touch-operated switch image, the CPU 21 performs, in response to the value adjusting operation, the aforementioned operations of step S10 to S12 for the operated parameter (namely, the parameter corresponding to the switch image being touch-operated by the human operator on the display 23). Then, in response to ending of the touch operation of the switch image, the CPU 21 performs the aforementioned operation of step S3.

As still another embodiment, the mixer 20 includes a knob operable in two directions, and the knob may be constructed to function as the adjuster 11 (namely, manual-operator for adjusting the parameter value) when the knob is operated in the first direction and function as the mode selector 12 (namely, manual-operator for the mode selector circuit) when the knob is operated in the second direction. This knob operable in two directions is, for example, a rotary operator of which a knob portion is operable in two directions to enable both a push or depression operation and a rotation operation of the knob portion. In this case, the CPU 21 starts the value adjustment processing of FIG. 6 in response to the rotation operation (operation in the first direction) of the knob portion and starts the operation mode switching processing of FIG. 5 in response to the push operation (operation in the second direction) of the knob portion. Another example of the operator operable in two directions is a fader operator of which a knob portion is operable in two directions to enable both a push operation and a linear slide operation of the knob portion. In this case, the CPU 21 starts the value adjustment processing of FIG. 6 in response to the slide operation (operation in the first direction) of the knob portion and starts the operation mode switching processing of FIG. 5 in response to the push operation (operation in the second direction) of the knob portion.

The aforementioned knob operable in two directions may be constructed as an unlatch type operator that maintains the temporary operation mode by being maintained in a pushed or depressed state and returns to the normal operation mode by being released from the depressed state. In such a case, temporary parameter value adjustment is enabled in the temporary operation mode by the human operator merely operating the knob portion of the knob in the first direction (for example, executing a rotation operation or slide operation of the knob portion) while maintaining the depression operation of the knob portion (i.e., operation in the second direction), and the adjusted parameter value can be returned to the pre-adjustment value by the human operator merely ending the depression operation of the knob portion. As another example, the knob operable in two directions may be constructed as a latch type operator that switches between the operation modes in response to each push or depression operation. In such a case, temporary parameter value adjustment is enabled in the temporary operation mode by the human operator merely operating the knob portion in the first direction (for example, executing a rotation operation or slide operation of the knob portion) after executing a depression operation of the knob portion (i.e., after operating the knob portion in the second direction), and the thus-adjusted parameter value can be returned to the pre-adjustment value by the human operator merely depressing the knob portion again.

As still another embodiment, the mixer 20 includes, as the adjuster 11, an operator equipped with a touch sense function (i.e., touch-sense-equipped operator), and the CPU 21, which starts the temporary operation mode in response to an operation of the mode switching switch 60 or mode switching switch image, may perform steps S11 and S12 above in response to the touch-sense-equipped operator being operated during the temporary operation mode and may end the temporary operation mode at step S3 above upon detection, by the touch sense function, that the operation of the touch-sense-equipped operator has been ended during the temporary operation mode. Namely, in FIG. 1, the controller 14 may determine that the temporary operation mode has been ended upon detecting, based on output of the touch-sense-equipped operator, that a user's touch operation of the touch-sense-equipped operator has been ended during the temporary operation mode, and may then perform the return control task.

As still another embodiment, the mixer 20 may include, as the adjuster 11, an operator capable of imparting a reactive force such that a reactive force is generated in the operator in response to a user's operation of the operator. Once the user's operation of the operator executed during the temporary operation mode is ended, it may be determined that the temporary operation mode has been ended, in response to the generation of the reactive force in the operator being stopped. In such a case, detecting that the generation of the reactive force in the operator has been stopped functions as the aforementioned operation of step S3 (namely, ending of the temporary operation mode via the switching section 12). Such an operator capable of imparting a reactive force is, for example, an operator of which a knob portion is automatically controllable in position by a motor or the like, and it is only necessary that such an operator be servo-controlled in such a manner as to generate a reactive force of appropriate intensity against, or in a direction opposite, a user's manual operation of the operator. In such a case, when the reactive force to be imparted through the servo control has returned from a significant value to substantial zero, it can be detected that the reactive force has stopped being generated in the operator. Another example of the operator capable of imparting a reactive force is an operation having an urging means, such as a spring, built therein. In such a case, once the operator is returned to a predetermined position by the urging means, it can be detected that the reactive force has stopped being generated in the operator.

In the case where the temporary operation mode is ended in response to an operation of the mode switching switch 60 (mode selector), the temporary operation mode may be ended collectively for the plurality of operators (adjusters 11) in the operator group 24. In the case where the setting device is constructed in such a manner that the temporary operation mode is ended in response to ending of an operation of any of the operators (adjusters 11) in the operator group 24, on the other hand, the temporary operation mode may be ended separately only for the operated operator (adjuster 11) in response to ending of the operation of that operator (adjuster 11), or the temporary operation mode may be ended collectively for a plurality of the operators (adjusters 11) in the operator group 24 in response to ending of operations of one or any plural number of the operators (adjusters 11).

Further, as techniques for ending the temporary operation mode, the above description of the embodiments discloses a technique where starting (turning-ON) and ending (turning-OFF) of the temporary operation mode are switched alternately in response to each operation of the mode selector 12, and a technique where the temporary operation mode is ended automatically in response to ending of a parameter value adjusting operation being detected via the adjuster 11 constructed as the touch-sense-equipped operator or the operator capable of imparting a reactive force. However, the inventive setting device is not so limited; for example, the inventive setting device may be provided with a dedicated switch or button operable by the user to end the temporary operation mode.

According to the mixer 20 having the inventive setting device applied thereto, when the user himself or herself intentionally starts the temporary operation mode by executing an operation mode switching operation and then a value of a parameter is adjusted after the start of the temporary operation mode, a change history is recorded for the adjusted parameter value, and thus, only the adjusted parameter value can be returned to the pre-adjustment value upon ending of the temporary operation mode. Thus, after the parameter value is adjusted or changed temporarily, the parameter value can be returned to the pre-change value easily, quickly, and accurately. Because the parameter value returning processing is performed only on each parameter adjusted during the temporary operation mode, a necessary time and processing load for returning the parameter to the previous state can be significantly reduced as compared with the conventional scene function that rewrites values of an enormous numbers of parameters all together. Thus, there is no possibility of the inventive arrangements presenting the inconveniences that the mixer 20 becomes inoperable, a sound signal output from the mixer 20 is cut or broken halfway, and the like. Thus, the parameter value returning processing described here is suitable for applications where values of parameters are changed temporarily in the middle of a live performance, such as a music concert or theatrical play (i.e., during the time that sound signals are being output from the mixer 20).

Further, by using the above-described temporary operation mode, it is possible to easily, quickly and accurately execute operations for, as in an ending portion of a music performance, temporarily increasing a degree of effectiveness of an effect, such as a reverb and then returning the effect to the previous degree in response to ending of the music performance. Further, by using the above-described temporary operation mode, it is possible to easily, quickly, and accurately execute operations for, for example, temporarily strongly imparting an effect, such as a delay, to a sound signal of a particular channel or temporarily adjusting volume of a sound signal of a particular channel and then returning the effect or volume to the previous state at a desired timing. Furthermore, in a theatrical play or the like, it is possible to easily, quickly, and accurately execute operations for turning on only a channel that processes voice of a currently speaking person with each of the other channels processing voice of the other persons temporarily turned off and then returning the turned-off channels to an ON state upon ending of the speech of the speaking person. Namely, by using the above-described temporary operation mode, it is possible to easily, quickly, and accurately carry out a dynamic musical or acoustic effect rendering responsive to operations of the mixer 20, with the result that parameter adjustment intended by the human operator can be made in an efficient manner.

Although various embodiments have been described above, it should be appreciated that the present invention is not limited to the above-described embodiments and may be modified variously within the scope of the technical ideal disclosed in the claims, description and drawings. For example, the inventive setting device 10 may be applied to any types of apparatus, such as a recorder and a processor, as long as such apparatus handle sound signals. Further, the setting device 10 may be constructed of a dedicated hardware device (integrated circuit etc.) that is configured to perform the functions of the various components 11, 12, 13, and 14 shown in FIG. 1. Furthermore, the inventive setting device 10 may be implemented by a processor device having functions for executing a program for performing the functions of the components 11, 12, 13, and 14 shown in FIG. 1. For example, the inventive setting device 10 is applicable to a DAW (Digital Audio Workstation) software application executed on a personal computer.

One aspect of the inventive device understood from the above-described embodiments is the setting device (10) for setting a signal processing parameter in the signal processing apparatus (20), which includes: the adjuster (11) operable by the user for adjusting a value of a parameter; the mode selector (12) for selecting the temporary operation mode that is a mode for temporarily operating the adjuster; the memory (13); and the controller (14) that performs (a) storage control for, in association with an adjusting operation executed via the adjuster while the temporary operation mode is selected, storing into the memory a pre-change value of the parameter as a change history and (b) return control for returning the adjusted parameter value of the adjuster to the pre-change parameter value in response to ending of the temporary operation mode and based on the stored change history. In one of the above-described specific examples, the controller (14) includes: the storage medium (22) storing a program; and the processor (CPU 21) for executing the program. When executing the program, the processor (21) is configured to perform: a storage control task (S11) for, in association with an adjusting operation executed via the adjuster while the temporary operation mode is selected, storing into the memory a pre-change parameter value as a change history; and a return control task (S3; S20 to S24) for returning the adjusted parameter value of the adjuster to the pre-change parameter value based on the stored change history in response to ending of the temporary operation mode.

An embodiment based on the above-described control by the CPU 21 can be understood as a method for setting a signal processing parameter in the signal processing apparatus (20) that includes the adjuster (11; 24) operable by the user for adjusting a value of a parameter and the memory (13: 22) This method includes: selecting the temporary operation mode that is a mode for temporarily operating the adjuster (S1, S2); storing into the memory a pre-change parameter value as a change history (S11); and returning the adjusted parameter value of the adjuster to the pre-change parameter value based on the stored change history in response to ending of the temporary operation mode (S3; S20 to S24). Furthermore, the embodiment related to the above-described control by the CPU 21 can also be understood as a program for causing a computer to perform the individual steps of the aforementioned method, as well as a computer-readable, non-transitory storage medium storing the aforementioned program.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A setting device for setting a signal processing parameter in a signal processing apparatus, the setting device comprising:

a manual-operator operable by a user for adjusting a value of a parameter;
a mode selector circuit that selects a temporary operation mode that is a mode for temporarily operating the manual-operator;
a memory; and
a processor configured to perform:
   a storage control task for, in association with an adjusting operation executed via the manual-operator while the temporary operation mode is selected, storing into the memory a pre-change parameter value, which is a value of the parameter before the adjusting, as a change history; and
   a return control task for, in response to ending of the temporary operation mode and based on the change history, returning the adjusted parameter value of the manual-operator to the pre-change parameter value.

2. The setting device as claimed in claim 1, wherein:
the storage control task performed by the processor includes storing, into the memory as the change history, one or more pre-change parameter values corresponding to one or more adjusting operations performed via the manual-operator during the temporary operation mode, and
the return control task performed by the processor includes sequentially reproducing, based on the change history stored in the memory, the one or more pre-change parameter values, corresponding to the one or more adjusting operations executed during the temporary operation mode, as one or more adjusted parameter values of the manual-operator.

3. The setting device as claimed in claim 2, wherein the return control task performed by the processor includes sequentially reproducing, based on the change history stored in the memory and in an order opposite the change history, the one or more pre-change parameter values, corresponding to the one or more adjusting operations executed during the temporary operation mode, as the one or more adjusted parameter values of the manual-operator.

4. The setting device as claimed in claim 2, wherein the return control task performed by the processor includes sequentially reproducing, based on the change history stored in the memory and in a same order as the change history, the one or more pre-change parameter values, corresponding to the one or more adjusting operations executed during the temporary operation mode, as the one or more adjusted parameter values of the manual-operator.

5. The setting device as claimed in claim 2, wherein:
the storage control task performed by the processor further includes storing, into the memory as the change history, change timing information indicative of individual timings at which one or more adjusting operations have been executed via the manual-operator during the temporary operation mode, and
the return control task performed by the processor includes sequentially reproducing, in accordance with processing timings based on the change timing information, the one or more pre-change parameter values, corresponding to the one or more adjusting operations executed during the temporary operation mode, as the one or more adjusted parameter values of the manual-operator.

6. The setting device as claimed in claim 2, wherein a plurality of the manual-operators are provided, and the return control task performed by the processor includes sequentially reproducing, in accordance with the change history for each manual-operator, respective ones of the pre-change parameter values of the plurality of the manual-operators corresponding to the adjusting operations executed during the temporary operation mode.

7. The setting device as claimed in claim 1, wherein the return control task performed by the processor comprises returning, in response to ending of the temporary operation mode and based on the change history, the adjusted parameter value of the manual-operator to a value immediately before the temporary operation mode is started.

8. The setting device as claimed in claim 1, wherein the return control task performed by the processor shifts the adjusted parameter value of the manual-operator gradually to the pre-change parameter value that is to be returned to.

9. The setting device as claimed in claim 1, wherein the return control task performed by the processor shifts, in accordance with a shift rule defined in accordance with a type of the parameter, the adjusted parameter value of the manual-operator to the pre-change parameter value that is to be returned to.

10. The setting device as claimed in claim 1, wherein the return control task performed by the processor shifts, in accordance with a shift rule defined in accordance with a type of a performance program, the adjusted parameter value of the manual-operator to the pre-change parameter value that is to be returned to.

11. The setting device as claimed in claim 1, wherein the mode selector circuit includes a push button switch.

12. The setting device as claimed in claim 11, wherein the push button switch in a depressed state maintains the temporary operation mode and in a released state ends the temporary operation mode.

13. The setting device as claimed in claim 11, wherein in response to a depression operation of the push button switch starts the temporary operation mode and in response to another depression operation of the push button switch during the temporary operation mode ends the temporary operation mode.

14. The setting device as claimed in claim 1, further comprising:
a knob operable in two directions,
wherein the knob functions as the manual-operator for adjusting the value of the parameter when the knob is operated in a first direction of the two directions and functions as a manual-operator for the mode selector circuit when the knob is operated in a second direction of the two directions.

15. The setting device as claimed in claim 1, wherein:
the manual-operator comprises a touch-sense-equipped operator, and
in response to detecting, based on output from the touch-sense-equipped operator, that a user's touch operation of the touch-sense-equipped operator has been ended during the temporary operation mode, the processor determines that the temporary operation mode has been ended, and then the processor performs the return control task.

16. The setting device as claimed in claim 1, wherein:
the manual-operator is an operator capable of imparting a reactive force such that a reactive force is generated in the operator in response to a user's operation of the operator, and
in response to generation of the reactive force in the operator being stopped due to ending of the user's operation of the operator executed during the temporary operation mode, the processor determines that the temporary operation mode has been ended, and then the processor performs the return control task.

17. A method of setting a signal processing parameter in a signal processing apparatus including a manual-operator operable by a user for adjusting a value of a parameter, and a memory, the method comprising:
selecting a temporary operation mode that is a mode for temporarily operating the manual-operator;
in association with an adjusting operation executed via the manual-operator while the temporary operation mode is selected, storing into the memory a pre-change parameter value, which is a value of the parameter before the adjusting, as a change history; and
in response to ending of the temporary operation mode and based on the change history, returning the adjusted parameter value of the manual-operator to the pre-change parameter value.

18. The method as claimed in claim 17, wherein:
the memory stores therein, as the change history, one or more pre-change parameter values corresponding to one or more adjusting operations performed via the manual-operator during the temporary operation mode, and
the adjusted parameter value of the manual-operator is returned to the pre-change parameter value so that the one or more pre-change parameter values corresponding to the one or more adjusting operations executed during the temporary operation mode are sequentially reproduced based on the change history stored in the memory.

19. The method as claimed in claim 18, wherein the adjusted parameter value of the manual-operator is returned to the pre-change parameter value so that the one or more pre-change parameter values corresponding to the one or more adjusting operations executed during the temporary operation mode are sequentially reproduced based on the change history stored in the memory and in an order opposite the change history.

20. The method as claimed in claim 18, wherein the adjusted parameter value of the manual-operator is returned to the pre-change parameter value so that the one or more pre-change parameter values corresponding to the one or more adjusting operations executed during the temporary operation mode are sequentially reproduced based on the change history stored in the memory and in a same order as the change history.

21. The method as claimed in claim 18, wherein:
the memory further stores therein, as the change history, change timing information indicative of individual timings at which one or more adjusting operations have been executed via the manual-operator during the temporary operation mode, and
the adjusted parameter value of the manual-operator is returned to the pre-change parameter value so that the one or more pre-change parameter values corresponding to the one or more adjusting operations executed during the temporary operation mode are sequentially reproduced in accordance with processing timings based on the change timing information.

22. The method as claimed in claim 18, wherein:
a plurality of the manual-operators are provided, and
the adjusted parameter value of the manual-operator is returned to the pre-change parameter value so that respective ones of the pre-change parameter values of the plurality of the manual-operators corresponding to the adjusting operations executed during the temporary operation mode are sequentially reproduced in accordance with the change history for each manual-operator.

23. The method as claimed in claim 17, wherein, in response to ending of the temporary operation mode and based on the change history, the adjusted parameter value of the manual-operator is returned to a value immediately before the temporary operation mode is started.

24. The method as claimed in claim 17, wherein the returning of the adjusted parameter value returns the adjusted parameter value of the manual-operator to the pre-change parameter value so that the adjusted parameter value of the manual-operator is gradually shifted to the pre-change parameter value that is to be returned to.

25. The method as claimed in claim 17, wherein the returning of the adjusted parameter value returns the adjusted parameter value of the manual-operator to the pre-change parameter value so that the adjusted parameter value of the manual-operator is shifted to the pre-change parameter value that is to be returned to in accordance with a shift rule defined in accordance with a type of the parameter.

\* \* \* \* \*